(12) United States Patent
Tanaka et al.

(10) Patent No.: US 8,533,370 B2
(45) Date of Patent: Sep. 10, 2013

(54) DEVICE AND METHOD FOR ENABLING A HOST APPARATUS TO ACCESS A PERIPHERAL DEVICE

(75) Inventors: Minoru Tanaka, Chiba (JP); Itaru Maekawa, Tokyo (JP); Hidemasa Yoshida, Tokyo (JP)

(73) Assignee: Sony Corporation, Tokyo (JP)

( * ) Notice: Subject to any disclaimer, the term of this patent is extended or adjusted under 35 U.S.C. 154(b) by 207 days.

(21) Appl. No.: 12/909,637

(22) Filed: Oct. 21, 2010

(65) Prior Publication Data

US 2011/0106984 A1    May 5, 2011

(30) Foreign Application Priority Data

Oct. 30, 2009  (JP) ................................ 2009-250805

(51) Int. Cl.
    *G06F 3/00*    (2006.01)
(52) U.S. Cl.
    USPC ............................................. 710/16; 710/15
(58) Field of Classification Search
    None
    See application file for complete search history.

(56) References Cited

U.S. PATENT DOCUMENTS

| | | | |
|---|---|---|---|
| 7,870,274 B1* | 1/2011 | Contino et al. | 709/229 |
| 8,037,229 B2* | 10/2011 | Zer et al. | 710/308 |
| 8,166,220 B2* | 4/2012 | Ben-Yacov et al. | 710/74 |
| 2003/0074529 A1* | 4/2003 | Crohas | 711/115 |

FOREIGN PATENT DOCUMENTS

JP    2001-307024 A    11/2001

OTHER PUBLICATIONS

Ron White; Hoe Computers Work; 2004; Que; Seventh Edition; p. 319.*

* cited by examiner

*Primary Examiner* — Idriss N Alrobaye
*Assistant Examiner* — Richard B Franklin
(74) *Attorney, Agent, or Firm* — Sony Corporation

(57) ABSTRACT

There is provided a radio communication device including: a host connection interface which is connected to a host apparatus and receives commands input from the host apparatus; a radio communication interface which performs radio communication with another radio communication device; and a controlling unit which controls operation of the host connection interface and the radio communication interface, wherein the controlling unit controls the host connection interface to output device information indicating that the device itself is a peripheral device capable of accessing a storage medium to the host apparatus in response to a command indicating inquiry about information regarding the device.

20 Claims, 7 Drawing Sheets

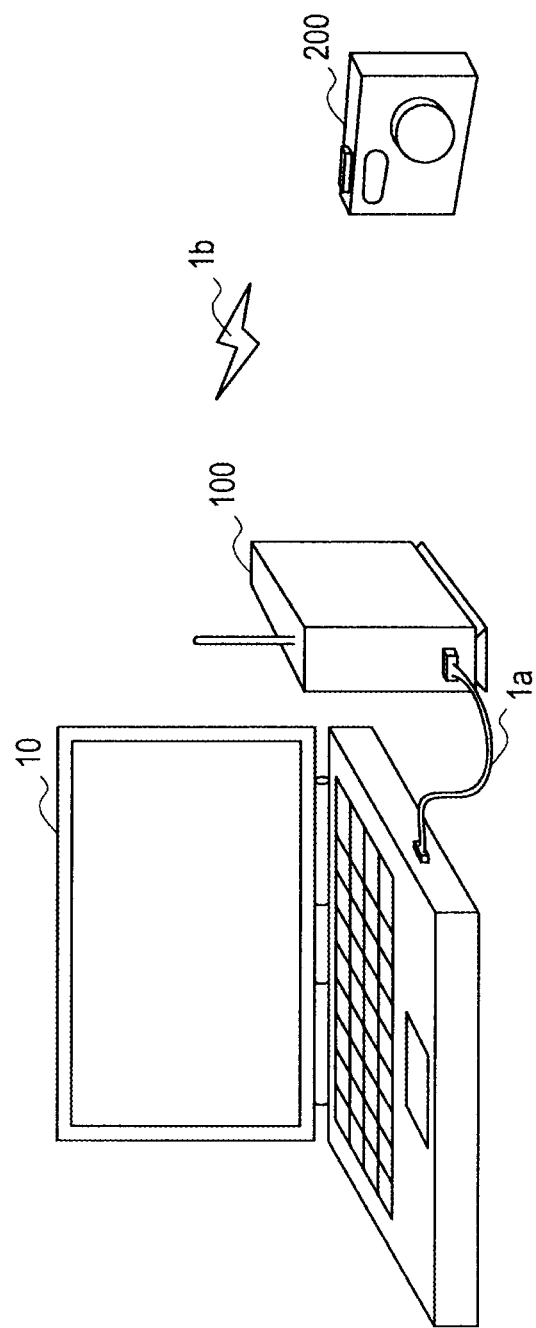

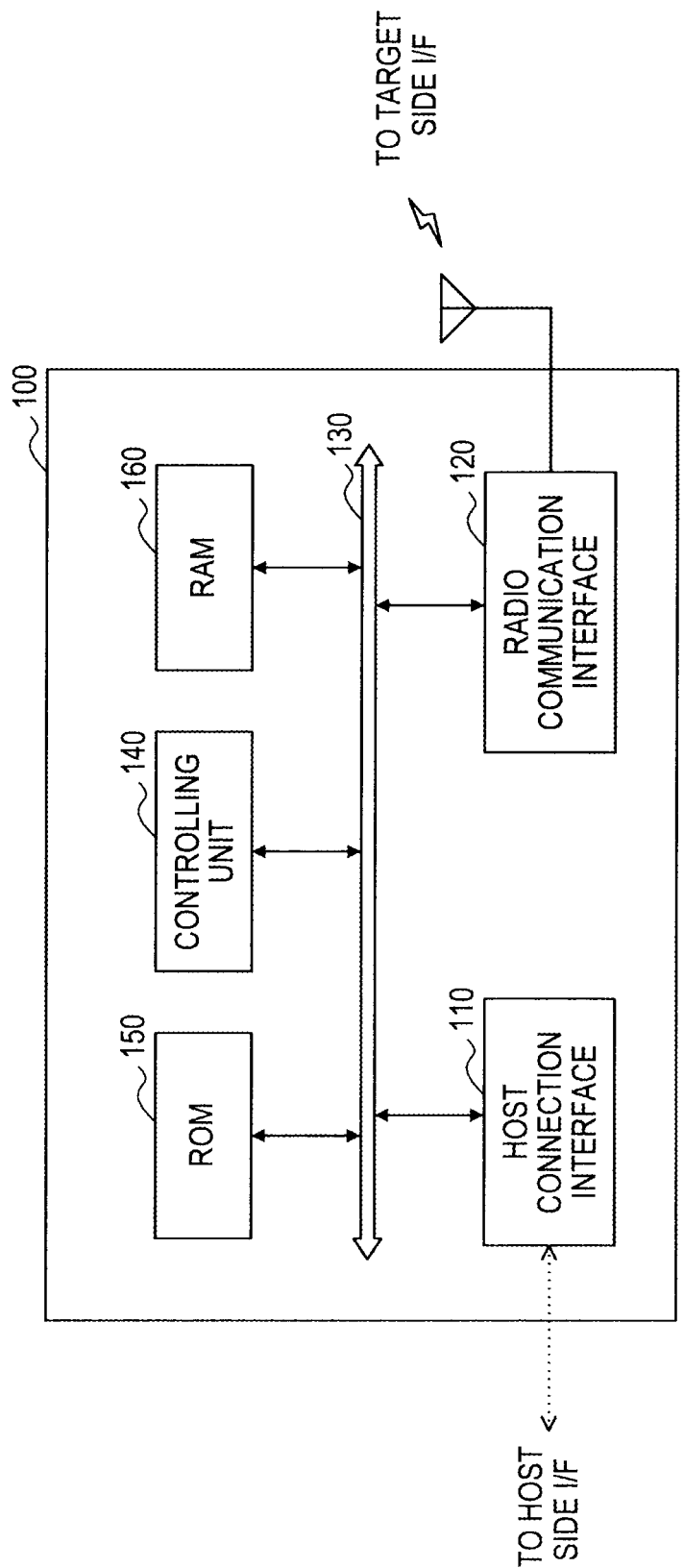

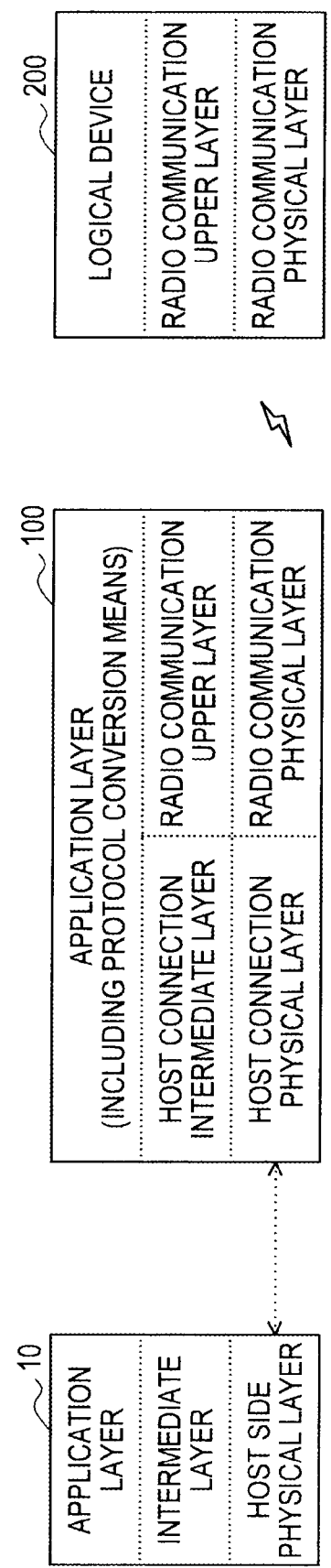

FIG.4

| HOST SIDE COMMAND NAME | OPERATIONAL DETAILS | |
|---|---|---|
| | TARGET CONNECTED | TARGET NON-CONNECTED |
| DEVICE INFORMATION ACQUISITION | OUTPUT DEVICE INFORMATION | |
| STATE VERIFICATION | OUTPUT "READY" | OUTPUT "NOT-READY" |
| EXAMINATION REQUEST | — | OUTPUT "MEDIUM NON-ATTACHED" |
| CAPACITY INFORMATION ACQUISITION | TRANSFER TO TARGET | ERROR |
| DATA READING | TRANSFER TO TARGET | ERROR |
| DATA WRITING | TRANSFER TO TARGET | ERROR |

| bit / byte | 7 | 6 | 5 | 4 | 3 | 2 | 1 | 0 |
|---|---|---|---|---|---|---|---|---|
| 1 | Peripheral Qualifier ||| Peripheral Device Type |||||
| | — ||| DIRECT ACCESS DRIVE |||||
| 2 | RMB | Reserved |||||||
| | Yes | |||||||
| ⋮ | (THE REST IS OMITTED) ||||||||

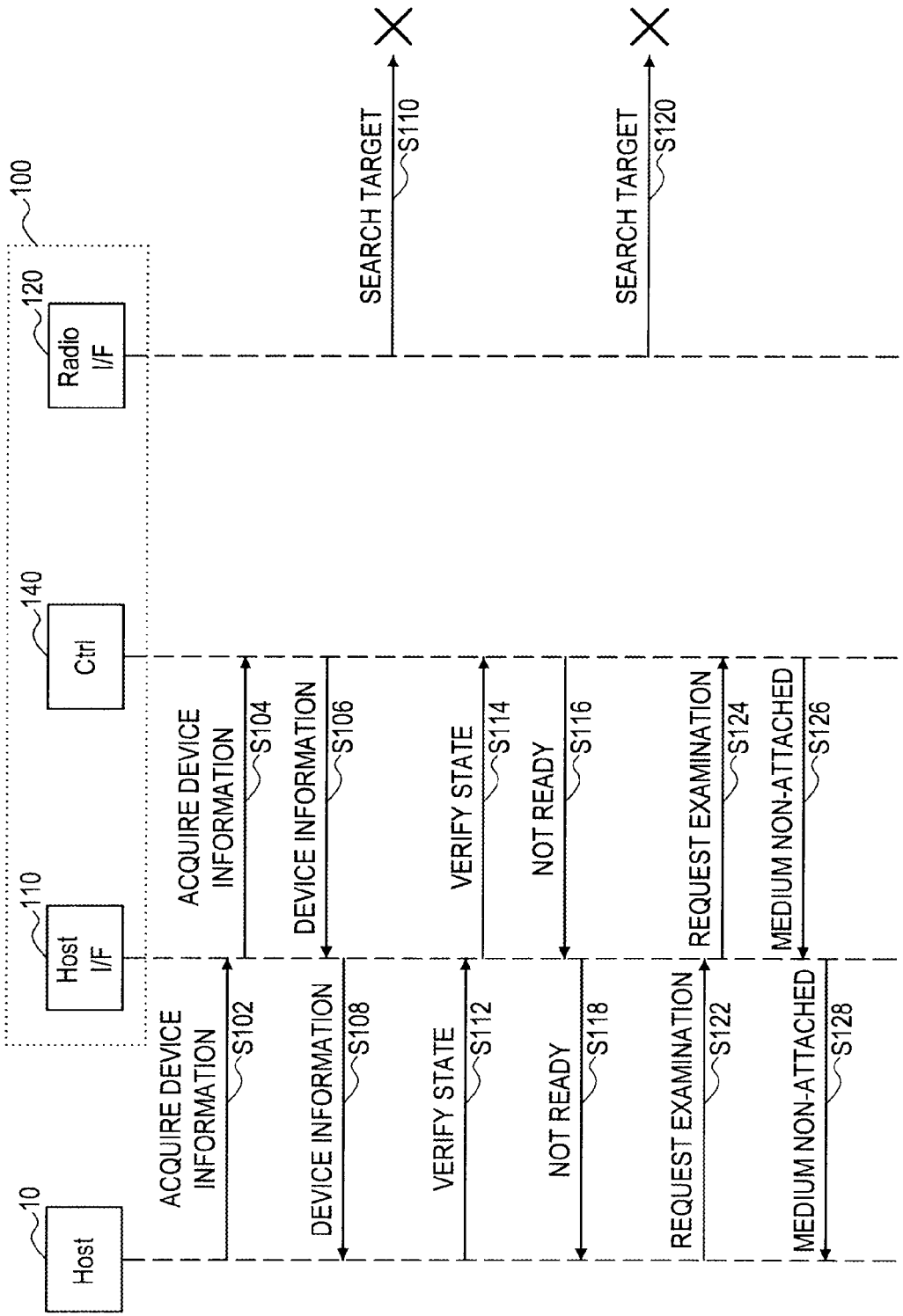

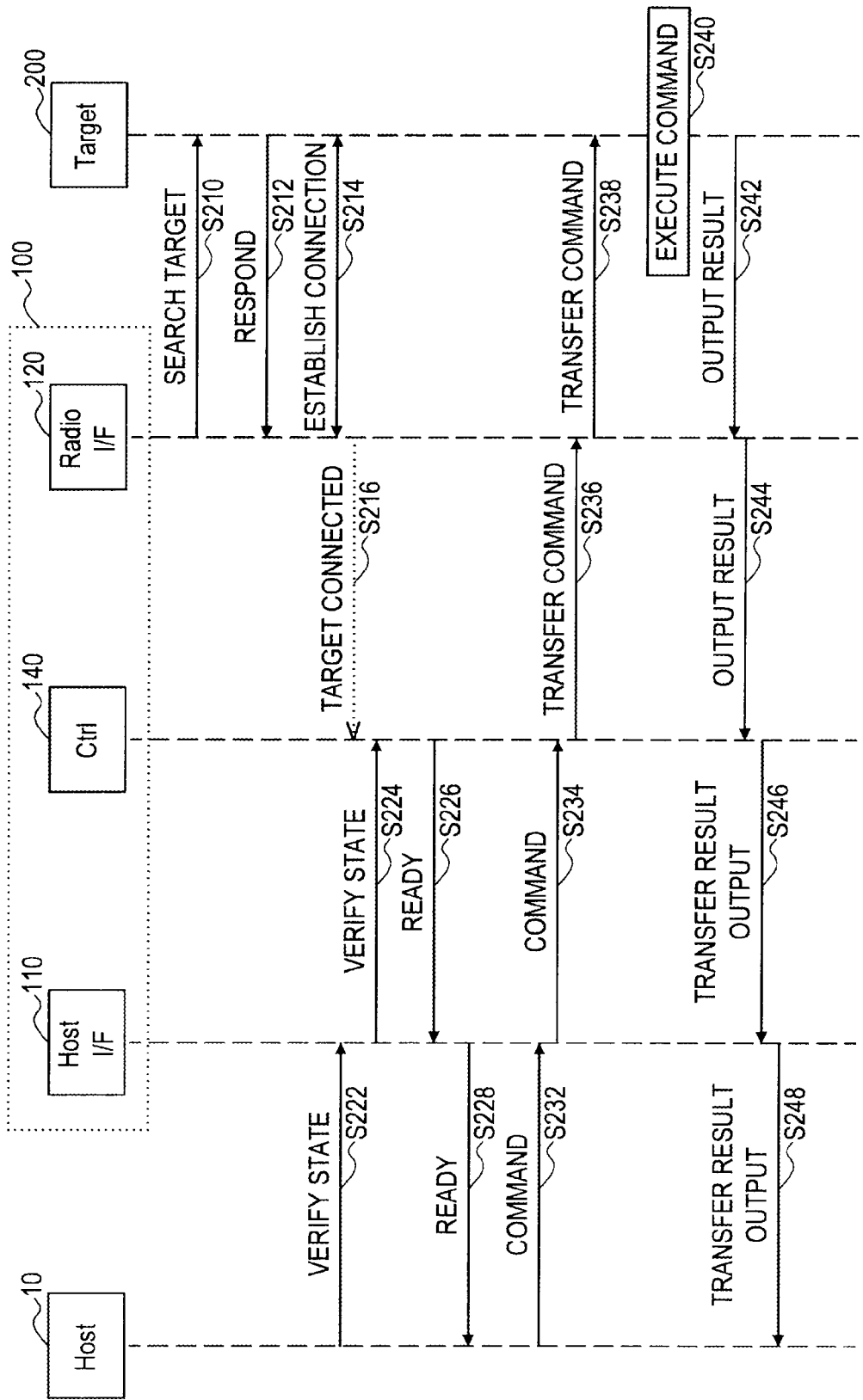

DEVICE AND METHOD FOR ENABLING A HOST APPARATUS TO ACCESS A PERIPHERAL DEVICE

BACKGROUND OF THE INVENTION

1. Field of the Invention

The present invention relates to a radio communication device, a method of responding to a host apparatus and a program.

2. Description of the Related Art

Recently, various radio communication standards have been in actual use to mutually connect between a computer, an information terminal, a digital consumer electronic appliance and the like without a cable. TransferJet (registered trademark), Bluetooth (registered trademark), WiMAX (registered trademark) and the like are examples of such radio communication standards. In order to perform radio communication in accordance with the above radio communication standards, a radio communication interface implemented according to each standard is utilized. There exist two main types for such radio communication interface, which are a built-in type being previously built into an apparatus and an external type being externally connected to an apparatus.

A radio communication interface of the external type is connected to a host apparatus as a peripheral device by utilizing a connection method such as a universal serial bus (USB), IEEE1394 and PCI Express. For example, when USB is utilized, the host apparatus recognizes the type of the connected peripheral device as a USB Class. The USB Class of the radio communication interface may be a "Communication Device" class, a "vender-specific" class or the like. Then, depending on a type of the device recognized as the USB class, the host apparatus displays information regarding the peripheral device on a screen or performs control of the peripheral device.

An example of the configuration in the case that a peripheral device is connected to a host apparatus by utilizing a USB has been disclosed in Japanese Patent Application Laid-Open No. 2001-307024.

SUMMARY OF THE INVENTION

In the case that a radio communication interface is connected to a host apparatus, the connection purpose is normally not to utilize the radio communication interface itself but to utilize another device via the radio communication interface. Accordingly, in the case of accessing a storage device as another device, for example, it is important from a viewpoint of users whether or not accessing to the storage device is possible regardless of presence or absence of the radio communication interface.

Further, most host apparatuses respectively have a driver to operate a storage device as a peripheral device. Accordingly, if the radio connection state with such another device via the radio communication interface can be treated as a state of an external storage device, an advantage is obtained from a viewpoint of the host apparatus such that different control according to presence or absence of the radio communication interface will be unnecessary.

In light of foregoing, it is desirable to provide a novel and improved radio communication device, a method of responding to a host apparatus and a program which enable the host apparatus to treat a state of radio connection with another device via a radio communication interface as a state of an external storage device.

According to an embodiment of the present invention, there is provided a radio communication device including: a host connection interface which is connected to a host apparatus and receives commands input from the host apparatus; a radio communication interface which performs radio communication with another radio communication device; and a controlling unit which controls operation of the host connection interface and the radio communication interface, wherein the controlling unit controls the host connection interface to output device information indicating that the device itself is a peripheral device capable of accessing a storage medium to the host apparatus in response to a command indicating inquiry about information regarding the device.

According to the above configuration, device information indicating that the radio communication device is a peripheral device capable of accessing the storage medium is output from the host connection interface to the host apparatus as a response to the command indicating inquiry about information regarding the device information input from the host apparatus.

The device information may be information indicating that the radio communication device is a peripheral device capable of accessing a removable storage medium.

When connection between the radio communication interface and another radio communication device is not established, the controlling unit may control the host connection interface to output the device information, indicating that a removable storage medium is not attached, to the host apparatus.

Such another radio communication device may be a device having a storage medium, and the controlling unit may transfer at least one of commands input from the host apparatus to such another radio communication device via the radio communication interface when connection between the radio communication interface and such another radio communication device is established.

The radio communication device may further include: a storage unit which previously stores data defining commands at least either to be transferred or not to be transferred to another radio communication device in a case that connection between the radio communication interface and such another radio communication device is established.

The controlling unit may convert a format of a command from a format corresponding to a first protocol with which the host connection interface complies into a format corresponding to a second protocol with which the radio communication interface complies when the command input from the host apparatus is transferred to such another radio communication device.

The radio communication interface may regularly search for another radio communication device to be connected while connection between the radio communication interface and another radio communication device is not established.

According to another embodiment of the present invention, there is provided a method of responding to a host apparatus in a radio communication device which is a peripheral device including a host connection interface connected to the host apparatus and a radio communication interface performing radio communication with another radio communication device, including the steps of: receiving a command input from the host apparatus via the host connection interface; and outputting device information indicating that the radio communication device is a peripheral device capable of accessing a storage medium to the host apparatus via the host connection interface.

According to another embodiment of the present invention, there is provided a program for causing a computer arranged at a radio communication device which includes a host connection interface connected to a host apparatus and a radio communication interface performing radio communication with another radio communication device to function as a controlling unit which controls operation of the host connection interface and the radio communication interface, wherein the controlling unit controls the host connection interface to output device information indicating that the device itself is a peripheral device capable of accessing a storage medium to the host apparatus in a case that a command indicating inquiry about information regarding the device is input from the host apparatus via the host connection interface.

As described above, with the radio communication device, the method of responding to a host apparatus and the program according to the present invention, it is possible for the host apparatus to treat a state of radio connection with another device via a radio communication interface as a state of an external storage device.

BRIEF DESCRIPTION OF THE DRAWINGS

FIG. 1 is an explanatory view illustrating an outline of a system according to an embodiment;

FIG. 2 is a block diagram illustrating an example of the configuration of a radio communication device according to the embodiment;

FIG. 3 is an explanatory view illustrating an example of a protocol stack according to the embodiment;

FIG. 4 is an explanatory view illustrating an example of commands input from a host apparatus in the embodiment;

FIG. 5 is an explanatory view partially illustrating an example of device information output to the host apparatus in the embodiment;

FIG. 6 is a sequence diagram illustrating an example of process flow in a first scenario having radio connection non-established; and FIG. 7 is a sequence diagram illustrating an example of process flow in a second scenario having radio connection established.

DETAILED DESCRIPTION OF THE EMBODIMENT

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Embodiments of the present invention will be described in the following order.
1. System outline
2. Configuration example of radio communication device according to an embodiment
3. Process flow according to an embodiment
4. Conclusion
1. System Outline First, an outline of a system according to an embodiment of the present invention will be described with reference to FIG. 1. A radio communication device 100 according to the embodiment of the present invention is illustrated in FIG. 1. The radio communication device 100 is connected to a host apparatus 10 via a cable (1a). Further, the radio communication device 100 is wirelessly connected to another radio communication device 200 (1b).

In an example of FIG. 1, a personal computer (PC) is illustrated as the host apparatus 10. However, not limited to the example, the host apparatus 10 may be a digital consumer electronic appliance such as a digital television or a terminal device such as a cellular phone terminal, for example. In general, the host apparatus 10 has a peripheral device externally attached by utilizing a connection method such as USB, IEEE1394 and PCI Express. The host apparatus 10 has a host controller to set up the connection with a peripheral device, for example.

Further, the host apparatus 10 is provided with a device driver being software to control a peripheral device. Then, the host apparatus 10 acquires information of the peripheral device or controls the peripheral device by outputting commands included in a predetermined command set by utilizing the device driver to the peripheral device.

The radio communication device 100 is connected to the host apparatus 10 via a host connection interface and operates as the peripheral device. Further, the radio communication device 100 has a radio communication interface to perform radio communication with anther radio communication device. That is, the radio communication device 100 is also considered to be radio communication means for the host apparatus 10 to wirelessly communicate with another device. Here, instead of connecting the radio communication device 100 to the host apparatus 10 by utilizing a cable as illustrated in FIG. 1, a stick-shaped radio communication device 100 may be directly inserted to the host apparatus 10, for example.

The radio communication device 200 of FIG. 1 is an example of a device to perform radio communication with the radio communication device 100. In the example of FIG. 1, a digital still camera is illustrated as the radio communication device 200. The radio communication device 200 has a storage medium to store a taken image. When a command to request data reading is input from the host apparatus 10 via the radio communication device 100, the radio communication device 200 outputs image data stored at the storage medium as a radio signal.

Not limited to the above example, the radio communication device 200 may be a device of another type capable of operating as the peripheral device (for example, a storage device such as a hard disk drive, a terminal device such as a cellular phone terminal, or a digital consumer electronic appliance).

In general, with the connection form as illustrated in FIG. 1, the host apparatus 10 recognizes a radio communication interface which is externally connected thereto as a communication device. Then, the host apparatus 10 controls the radio communication interface by utilizing a driver to control the communication device. For example, when USB is adopted as a connection method, the radio communication interface may be recognized as a "vender-specific" class. In this case, a dedicated driver prepared for the radio communication device 100 is used for the control. However, as described above, the radio communication device 100 existing between the host apparatus 10 and the radio communication device 200 is merely a means for the host apparatus 10 to utilize the radio communication device 200. Accordingly, considering the above-mentioned viewpoints of users or host apparatuses, it is desirable that the radio communication device 100 provide, to the host apparatus 10, input/output specifications being similar to those in a case of direct connection between the host apparatus 10 and the radio communication device 200.

In the following, detailed description is given on the configuration of the radio communication device 100 which enables the host apparatus 10 to treat a state of radio connection with the radio communication device 200 via the radio communication interface as a state of an externally attached storage device.

2. Configuration Example of Radio Communication Device According to an Embodiment FIG. 2 is a block diagram illustrating an example of the configuration of the radio communication device 100 according to the present embodiment. As illustrated in FIG. 2, the radio communication device 100 includes a host connection interface 110, a radio communication interface 120, a bus 130, a controlling unit 140, a read only memory (ROM) 150 and a random access memory (RAM) 160.

2-1. Description of Each Block

The host connection interface 110 is connected to the host apparatus 10 as the connection 1*a* as illustrated in FIG. 1. The host connection interface 110 has a function as a device controller and receives commands input from the host apparatus 10. Further, the host connection interface 110 outputs, to the host apparatus 10, a response generated by the radio communication device 100 (or by the radio communication device 200) according to the command input from the host apparatus 10.

The radio communication interface 120 is utilized to perform radio communication with the radio communication device 200. The radio communication interface 120 converts a digital signal to be output from the radio communication device 100 into a radio signal by utilizing a radio frequency (RF) circuit and transmits it via an antenna. Further, the radio communication interface 120 receives a radio signal transmitted from the radio communication device 200 by utilizing the antenna and RF circuit and converts it into a digital signal.

In the present embodiment, in the case that connection is not established with another radio communication device, the radio communication interface 120 regularly searches for another radio communication device to be connected, for example, under the control of the controlling unit 140. Then, when a response from the radio communication device 200 located in the vicinity of the radio communication interface 120 is detected, the radio communication interface 120 establishes radio connection with the radio communication device 200.

The bus 130 mutually connects between the host connection interface 110, the radio communication interface 120, the controlling unit 140, the ROM 150 and the RAM 160.

The controlling unit 140 controls operation of the host connection interface 110 and the radio communication interface 120 by utilizing a processing device such as a central processing unit (CPU) or a digital signal processor (DSP). When a command indicating inquiry about information regarding the device is input from the host apparatus 10, for example, the controlling unit 140 controls the host connection interface 110 to output device information indicating that the device itself is a peripheral device capable of accessing the storage medium as a response to the command.

For example, the above-mentioned device information may be the information indicating that the radio communication device 100 is the peripheral device capable of accessing a removable storage medium. In this case, it is possible that the controlling unit 140 controls the host connection interface 110 to output a signal of presence or absence of connection between the radio communication interface 120 and another radio communication device to the host apparatus 10 as an attached/non-attached state of the removable storage medium.

Further, in the case that connection between the radio communication interface 120 and another radio communication device is established, the controlling unit 140 transfers at least one of commands input from the host apparatus 10 to another radio communication device via the radio communication interface 120. Here, the command to be transferred may be a command regarding information acquisition or operation of the storage medium of another radio communication device which is in connection, for example. It is possible to previously define which command is to be transferred to another radio communication device by utilizing data stored in the ROM 150, for example. Further, when transferring the command, the controlling unit 140 may convert the command format from a format corresponding to a first protocol with which the host connection interface 110 complies into a format corresponding to a second protocol with which the radio communication interface 120 complies.

The ROM 150 has a function as a storage unit of the radio communication device 100. The ROM 150 previously stores programs describing operation of each unit of the radio communication device 100, data to be used for the programs, and the like. The RAM 160 temporarily stores the above-mentioned program and data when executing the program, for example.

2-2. Example of Protocol Stack

FIG. 3 is an explanatory view illustrating an example of a protocol stack mounted on the host apparatus 10, the radio communication device 100 and the radio communication device 200 according to the present embodiment. FIG. 3 illustrates only the protocol associated with the present embodiment. That is, it is also possible that a protocol not illustrated in FIG. 3 is mounted on each device or apparatus in another embodiment.

As illustrated in FIG. 3, the host apparatus 10 has a protocol stack including three protocols of a host side physical layer, an intermediate layer and an application layer. The host side physical layer corresponds to a physical layer (PHY) of the host side of the protocol such as USB, IEEE1394 and PCI Express and the protocol is supported by a host controller. The intermediate layer is positioned between the host side physical layer and the application layer and conceals physical layer difference from the application layer. For example, the above-mentioned device driver (for example, a class driver corresponding to the USB class) operates at the intermediate layer. The application layer is positioned at the top of the protocol stack and issues a command to be provided to a peripheral device. The command issued by the application layer is output to the peripheral device via the intermediate layer and the host side physical layer.

The radio communication device 100 has a protocol stack including a host connection physical layer, a host connection intermediate layer, a radio communication physical layer, a radio communication upper layer and an application layer. The host connection physical layer corresponds to a physical layer (PHY) of the device side of the protocol such as USB, IEEE1394 and PCI Express and the protocol is supported by a device controller. The host connection intermediate layer is positioned between the host connection physical layer and the application layer and conceals physical layer difference from the application layer. Meanwhile, the radio communication physical layer corresponds to a physical layer (PHY) of a radio communication protocol such as TransferJet (registered trademark), Bluetooth (registered trademark) and WiMAX (registered trademark). The radio communication upper layer corresponds to a layer of a media access control (MAC) layer or upper of the radio communication protocol.

The application layer of the radio communication device 100 includes the function of the controlling unit 140 described mainly in association with FIG. 2. That is, the application layer of the radio communication device 100 recognizes the command input from the host apparatus 10. Then, the application layer of the radio communication device 100 responds for oneself corresponding to the recognized command or transfers the command to another radio communication device. In addition, the application layer of the radio communication device 100 has a function as protocol conversion means. Here, in the protocol stack exemplified in FIG. 3, the first protocol with which the host connection interface 110 complies differs from the second protocol with which the radio communication interface 120 complies. For example, the former is USB and the latter is TransferJet (registered trademark) and the like. In this case, the application layer converts the format of the command to be transferred from the format corresponding to the first protocol into the format corresponding to the second protocol. Accordingly, the host apparatus 10 can control the radio communication device 200 as a peripheral device without caring for the radio communication protocol between the radio communication device 100 and the radio communication device 200.

The radio communication device 200 has a protocol stack including a radio communication physical layer, a radio communication upper layer and a logical device. The radio communication physical layer corresponds to any of the above-mentioned (or another) physical layer (PHY) of the radio communication protocol and sends/receives a radio signal with the radio communication physical layer of the radio communication device 100. The radio communication upper layer corresponds to a layer of a MAC layer or upper of the radio communication protocol. The logical device is positioned at the top of the protocol stack and responds to the command transferred by the radio communication device 100.

2-3. Command Example

FIG. 4 is an explanatory view illustrating an example of commands to be input from the host apparatus 10 to the radio communication device 100 in the present embodiment. FIG. 4 illustrates six types of commands such as "Device Information Acquisition", "State Verification", "Examination Request", "Capacity Information Acquisition", "Data Reading" and "Data Writing" as examples of commands to be input from the host apparatus 10.

The "Device Information Acquisition" command is a command issued by the host apparatus 10 to acquire device information including a peripheral device type. For example, an "Inquiry" command in USB corresponds to the "Device Information Acquisition" command. The controlling unit 140 of the radio communication device 100 controls the host connection interface 110 to output device information indicating that the device itself is a peripheral device capable of accessing the storage medium in response to the "Device Information Acquisition" command.

FIG. 5 is an explanatory view partially illustrating an example of device information to be output to the host apparatus 10 in the present embodiment. As illustrated in FIG. 5, "Peripheral Device Type" is allocated to five bits as the latter half of the first byte of the device information. A value to denote "Direct Access Drive" indicating a peripheral device capable of accessing the storage medium is set at the "Peripheral Drive Type". The first one bit of the second byte of the device information is a flag of "Removable (RMB)" to indicate whether or not the storage medium of the peripheral device is removable. The "RMB" is set to be "1" to indicate that the storage medium is removable. It should be noted that, though not illustrated in FIG. 5, the device information may further include a number or a string identifying an individual peripheral device, an identifier of a manufacturer of the peripheral device or the like in addition to the above-mentioned values.

Since such device information is output from the radio communication device 100 to the host apparatus 10 in response to the "Device Information Acquisition" command, the host apparatus 10 can recognize the radio communication device 100 as a device capable of accessing the removable storage medium, not as a communication device.

Returning to FIG. 4, description will be continued on an example of the command to be input from the host apparatus 10 to the radio communication device 100.

The "State Verification" command is a command to verify whether or not a peripheral device is ready. For example, a "Test Unit Ready" command in USB corresponds to the "State Verification" command. When such a "State Verification" command is input, the controlling unit 140 of the radio communication device 100 verifies the state of radio connection between the radio communication interface 120 and another radio communication device. In the case that radio connection is not established (hereinafter, called "Target non-connected"), the controlling unit 140 replies that the peripheral device is not ready. On the other hand, in the case that the radio connection is established (hereinafter called "Target connected"), the controlling unit 140 replies that the peripheral device is ready.

The "Examination Request" command is a command for the host apparatus 10 to request examination of a peripheral device in the case that some error is detected such as a case that the peripheral device is not ready. For example, a "Request Sense" command in USB corresponds to the "Examination Request" command. When such an "Examination Request" command is input, the controlling unit 140 of the radio communication device 100 replies that a medium is not attached. Accordingly, in the case that the host apparatus 10 cannot utilize the targeted device since the radio connection is not established between the radio communication interface 120 and another radio communication device, for example, the information indicating that the medium is not attached is displayed on a screen of the host apparatus 10. In this manner, screen information being common and easily understandable due to the completely same control system can be provided to a user even without applying specific modification to the host apparatus 10 in both the case that the storage device is utilized via the radio communication device 100 and the case that the storage device is utilized not via the radio communication device 100, for example.

The "Capacity Information Acquisition" command is a command issued by the host apparatus 10 to inquire storage capacity of a storage medium of a peripheral device, for example. For example, a "Read Capacity" command in USB corresponds to the "Capacity Information Acquisition" command. When such a "Capacity Information Acquisition" command is input, the controlling unit 140 of the radio communication device 100 transfers the command to another radio communication device in the case of "Target connected". Accordingly, the data indicating the storage capacity of the storage medium of another radio communication device is replied from another radio communication device. Then, the controlling unit 140 controls the replied data to be further output to the host apparatus 10 via the host connection interface 110. On the other hand, in the case of "Target non-connected", the controlling unit 140 controls to output an error signal to the host apparatus 10.

The "Data Reading" command is a command issued by the host apparatus 10 to read data stored in a storage medium of a peripheral device, for example. For example, a "Read"

command in USB corresponds to the "Data Reading" command. Further, the "Data Writing" command is a command issued by the host apparatus 10 to write data in a storage medium of a peripheral device, for example. For example, a "Write" command in USB corresponds to the "Data Writing" command. When such a command is input, the controlling unit 140 of the radio communication device 100 transfers the input command to another radio communication device in connection in the case of "Target connected". Then, another radio communication device performs operation of data reading or data writing with respect to the storage medium of the device according to the transferred command. Accordingly, the host apparatus 10 can utilize another radio communication device via the radio communication apparatus 100.

The radio communication device 100 previously stores the data exemplified in FIG. 4, that is, the data defining commands at least either to be transferred or not to be transferred to another radio communication device in "Target-connected" by utilizing the ROM 150 of FIG. 2, for example. Accordingly, the controlling unit 140 can independently determine whether or not each command is to be transferred to another radio communication device by referring to the defining data.

3. Process Flow According to an Embodiment

Next, process flow corresponding to a radio connection state according to the present embodiment will be described with reference to FIGS. 6 and 7. FIG. 6 is a sequence diagram illustrating an example of process flow of the first scenario in which the radio connection is not established. Meanwhile, FIG. 7 is a sequence diagram illustrating an example of process flow of the second scenario in which the radio connection is to be established.

3-1. First Scenario

In the first scenario of FIG. 6, when the host apparatus 10 detects that the radio communication device 100 is connected thereto, the host apparatus 10 outputs the "Device Information Acquisition" command to the radio communication device 100 (step S102). The controlling unit 140 of the radio communication device 100 detects the "Device Information Acquisition" command via the host connection interface 110 (step S104). Then, the controlling unit 140 replies the device information described with reference to FIG. 5, that is, the information indicating that the device itself is a peripheral device capable of accessing the removable storage medium, via the host connection interface 110 (steps S106 and S108).

Meanwhile, when the radio communication device 100 starts to operate, the radio communication interface 120 regularly searches for another radio communication device to be connected (steps S110 and S120). However, in the present scenario, the connection is not established between the radio communication interface 120 and another radio communication device.

During that time, the host apparatus 10 outputs the "State Verification" command to the radio communication device 100 (step S112). The controlling unit 140 of the radio communication device 100 detects the "State Verification" command via the host connection interface 110 (step S114). Accordingly, being "Target non-connected" at that time, the controlling unit 140 replies via the host connection interface 110 that the peripheral device is not ready (steps S116 and S118).

Next, in order to know the reason for not being ready, the host apparatus 10 outputs the "Examination Request" command to the radio communication device 100 (step S122). The controlling unit 140 of the radio communication device 100 detects the "Examination Request" command via the host connection interface 110 (step S124). Accordingly, being "Target non-connected" at that time, the controlling unit 140 replies via the host connection interface 110 that a medium is not attached (steps S126 and S128).

3-2. Second Scenario

Next, in the second scenario of FIG. 7, the radio communication interface 120 continuously searches for another radio communication device to be connected (step S210). In the present scenario, a response is sent back from the radio communication device 200 positioned in the vicinity of the radio communication interface 120 (step S212). Accordingly, after mutual authentication procedure is performed if necessary, for example, connection is established between the radio communication interface 120 and the radio communication device 200 (step S214). Then, the controlling unit 140 recognizes that the radio connection state is varied to "Target connected" (step S216).

Next, the host apparatus 10 outputs the "State Verification" command to the radio communication device 100 (step S222). The controlling unit 140 detects the "State Verification" command via the host connection interface 110 (step S224). Accordingly, being "Target connected" at that time, the controlling unit 140 replies via the host connection interface 110 that the peripheral device is ready (steps S226 and S228).

The host apparatus 10 recognizing that the peripheral device is ready issues a command regarding information acquisition or operation of the storage medium of the peripheral device such as "Capacity Information Acquisition", "Data Reading" and "Data Writing" (step S232). The controlling unit 140 of the radio communication unit 100 detects the issued command via the host connection interface 110 (step S234). Subsequently, the controlling unit 140 determines that the command is to be transferred to the radio communication device 200 by referring to the table exemplified in FIG. 4, for example. Then, the controlling unit 140 transfers the command to the radio communication device 200 via the radio communication interface 120 (step S236).

Next, the radio communication device 200 receives the transferred command via the radio connection established in step S214 (step S238). Accordingly, the radio communication device 200 executes the transferred command (step S240) and outputs the execution result (step S242). For example, when the "Capacity Information Acquisition" command is transferred, the data indicating the storage capacity of the storage medium of the radio communication device 200 may be included in the execution result. When the "Data Reading" command is transferred, the data read from the storage medium of the radio communication device 200 may be included in the execution result. When the "Data Writing" command is transferred, the data indicating whether or not data writing in the storage medium of the radio communication device 200 is successful may be included in the execution result. Such a command execution result is received by the radio communication interface 120 of the radio communication device 100 via the radio connection (step S244).

Next, the controlling unit 140 of the radio communication device 100 transfers the command execution result received by the radio communication interface 120 to the host apparatus 10 via the host connection interface 110 (step S246). Then, the host apparatus 10 acquires the transferred command execution result (step S248).

Due to the above-mentioned process flow, the host apparatus 10 can utilize a targeted device (i.e., the radio communication device 200 in this case) with common operation regardless of being or not being via the radio communication device 100.

4. Conclusion

In the above, the embodiment of the present invention has been described with reference to FIGS. 1 to 7. With the radio communication device 100 according to the present embodiment, device information indicating that the device itself is a peripheral device capable of accessing the removable storage medium is output as a response to the command input from the host apparatus 10 and indicating inquiry about information regarding the device. Accordingly, the host apparatus 10 can recognize the connected device as an externally attached storage device.

In the case that the connection between the radio communication interface 120 and another radio communication device is not established, the radio communication device 100 outputs, to the host apparatus 10, information indicating that a removable storage medium is not attached. Such information is similar to the information output when a storage medium is not attached in the case that a peripheral device capable of accessing the removable storage medium is directly connected to the host apparatus 10. Therefore, according to the present embodiment, the host apparatus 10 can provide a user with the information indicating whether or not the targeted storage medium is accessible with common operation regardless of being or not being via the radio communication device 100.

Further, it is advantageous from a viewpoint of operational safety that the host apparatus 10 can commonly perform operation regardless of being or not being via the radio communication device 100. That is, when the host apparatus 10 is forced to perform operation after recognizing both states of the radio communication device 100 and the targeted device, patterns of exceptional processes are increased according to respective device states. For example, the patterns include a case that the medium is detached during radio connection, a case that radio connection is discontinued while the medium is attached, and the like. When such patterns of exceptional processes are increased, the possibility of occurrence of unexpected failures may increase. According to the present embodiment, since the host apparatus 10 is only suggested to recognize whether or not the targeted storage medium is accessible regardless of being or not being via the radio communication device 100, exceptional processes are reduced and operational safety is enhanced.

It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2009-250805 filed in the Japan Patent Office on Oct. 30, 2009, the entire content of which is hereby incorporated by reference.

What is claimed is:

1. A radio communication device comprising:
   a host connection interface, connected to a host apparatus, configured to receive a command from the host apparatus;
   a radio communication interface configured to perform radio communication with another radio communication device; and
   a controlling unit configured to control operation of the host connection interface and the radio communication interface,
   wherein the controlling unit controls the host connection interface to output device information of the radio communication device to the host apparatus in response to the command, wherein the received command indicates an inquiry about the device information, wherein the device information indicates that the radio communication device is a peripheral device capable of accessing a storage medium of the another radio communication device, wherein the host apparatus treats a state of a radio connection with the another radio communication device via the radio communication interface as a state of an external storage device.

2. The radio communication device according to claim 1, wherein the device information indicates that the radio communication device is a peripheral device capable of accessing a removable storage medium of the another radio communication device.

3. The radio communication device according to claim 2, wherein, when a connection between the radio communication interface and the another radio communication device is not established, the controlling unit controls the host connection interface to output the device information to the host apparatus, indicating that the removable storage medium is not attached to the host apparatus.

4. The radio communication device according to claim 3, wherein the another radio communication device is a device comprising a storage medium, and
   the controlling unit transfers a command from the host apparatus to the another radio communication device via the radio communication interface when a connection between the radio communication interface and the another radio communication device is established.

5. The radio communication device according to claim 4, further comprising:
   a storage unit to previously store data defining commands at least either to be transferred or not to be transferred to the another radio communication device in a case that a connection between the radio communication interface and the another radio communication device is established.

6. The radio communication device according to claim 4, wherein the controlling unit converts a format of the command from a format complying with a first protocol of the host connection interface into a format complying with a second protocol of the radio communication interface when the command is transferred from the host apparatus to the another radio communication device.

7. The radio communication device according to claim 1, wherein the radio communication interface regularly searches for the another radio communication device to be connected when a connection between the radio communication interface and the another radio communication device is not established.

8. A method of responding to a host apparatus by a radio communication device including a host connection interface connected to the host apparatus and a radio communication interface performing radio communication with another radio communication device, the method comprising steps of:
   receiving a command from the host apparatus via the host connection interface; and
   outputting device information to the host apparatus via the host connection interface indicating that the radio communication device is a peripheral device capable of accessing a storage medium of the another radio communication device, wherein the host apparatus treats a state of a radio connection with the another radio communication device via the radio communication interface as a state of an external storage device.

9. The method according to claim 8, wherein the device information indicates that the radio communication device is a peripheral device capable of accessing a removable storage medium of the another radio communication device.

10. The method according to claim 8, comprising verifying the state of the radio connection between the radio communication interface and the another radio communication device.

11. The method according to claim 8, comprising controlling the host connection interface to output the device information to the host apparatus when a connection between the radio communication interface and the another radio communication device is not established, wherein the device information indicates that the removable storage medium is not attached to the host apparatus.

12. The method according to claim 8, comprising transferring the command from the host apparatus to the another radio communication device via the radio communication interface when a connection between the radio communication interface and the another radio communication device is established.

13. The method according to claim 8, comprising converting a format of the command from a format complying with a first protocol of the host connection interface into a format complying with a second protocol of the radio communication interface when the command is transferred from the host apparatus to the another radio communication device.

14. A non-transitory computer-readable medium comprising a program, the program being executable by a processing device in a radio communication device, the radio communication device includes a host connection interface connected to the host apparatus and a radio communication interface performing radio communication with another radio communication device, the program causing the processing device performing steps of:
receiving a command from the host apparatus via the host connection interface, wherein the received command indicates an inquiry about device information; and
controlling the host connection interface to output the device information to the host apparatus, wherein the device information indicates that the radio communication device is a peripheral device capable of accessing a storage medium of the another radio communication device, wherein the host apparatus treats a state of a radio connection with the another radio communication device via the radio communication interface as a state of an external storage device.

15. The non-transitory computer-readable medium according to claim 14, comprising inquiring storage capacity of the storage medium of the another radio communication device based on the command issued by the host apparatus.

16. The non-transitory computer-readable medium according to claim 15, comprising receiving data from the another radio communication device in response to the command issued by the host apparatus, wherein the data indicates the storage capacity of the storage medium of the another radio communication device.

17. The non-transitory computer-readable medium according to claim 14, wherein the host apparatus provides a user with an information indicating accessibility of the storage medium of the another radio communication device based on a command via the radio communication device.

18. The non-transitory computer-readable medium according to claim 17, wherein, based on the command, the host apparatus provides the user with an information indicating accessibility of the storage medium of the another radio communication device independent of the radio communication device.

19. The non-transitory computer-readable medium according to claim 14, comprising determining a communication of the received command to the another radio communication device based on a predefined table.

20. The non-transitory computer-readable medium according to claim 19, wherein the predefined table comprises a plurality of commands and device information corresponding to each of the plurality of commands, wherein the device information is based on the state of the radio connection of the radio communication device with the another radio communication device.

* * * * *